P. EVANS.
CLUTCH CONSTRUCTION.
APPLICATION FILED MAY 8, 1912.
1,074,500.
Patented Sept. 30, 1913.
3 SHEETS—SHEET 3.
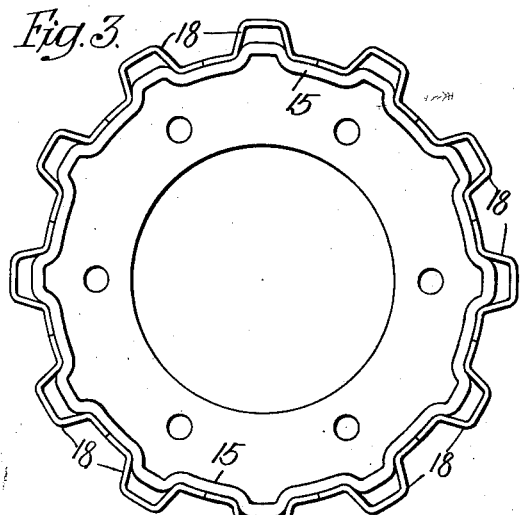
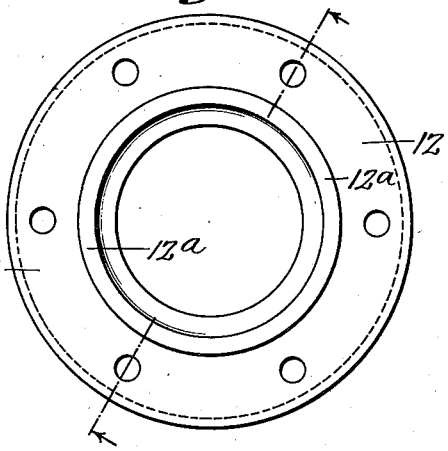
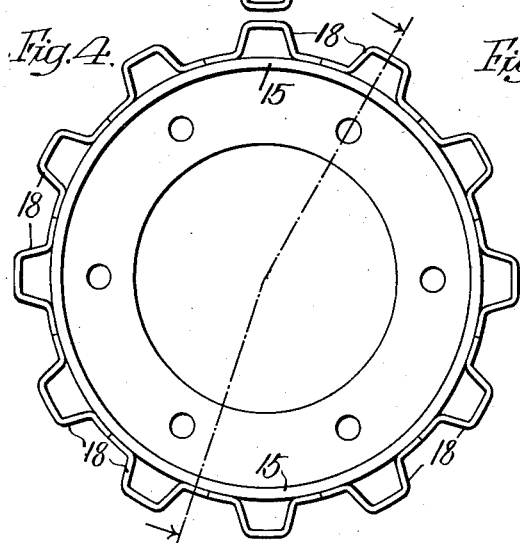
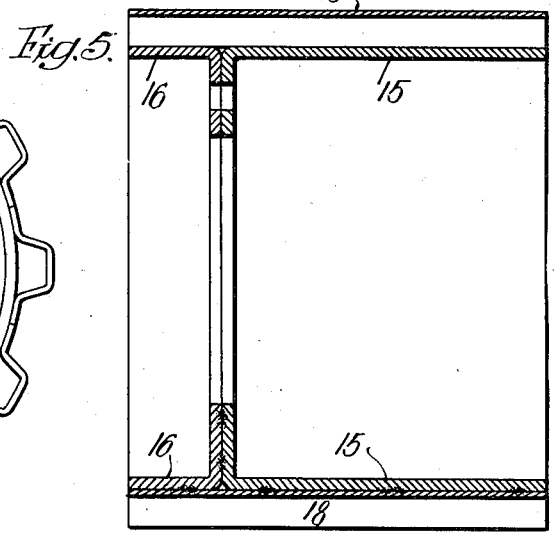
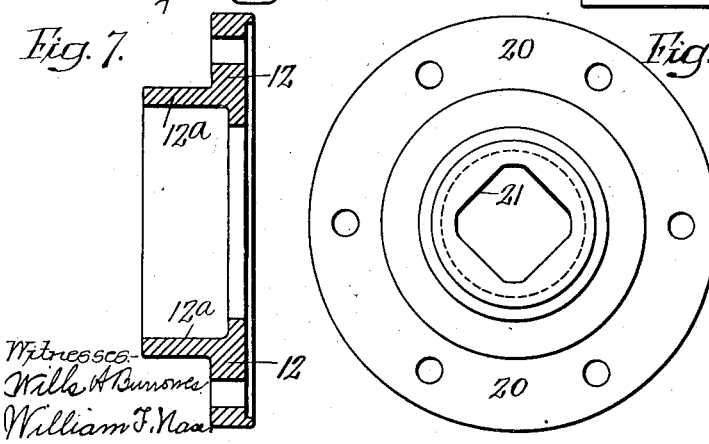
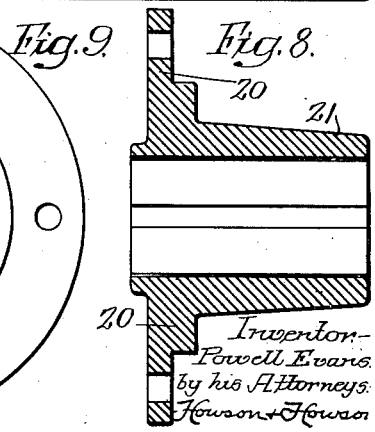

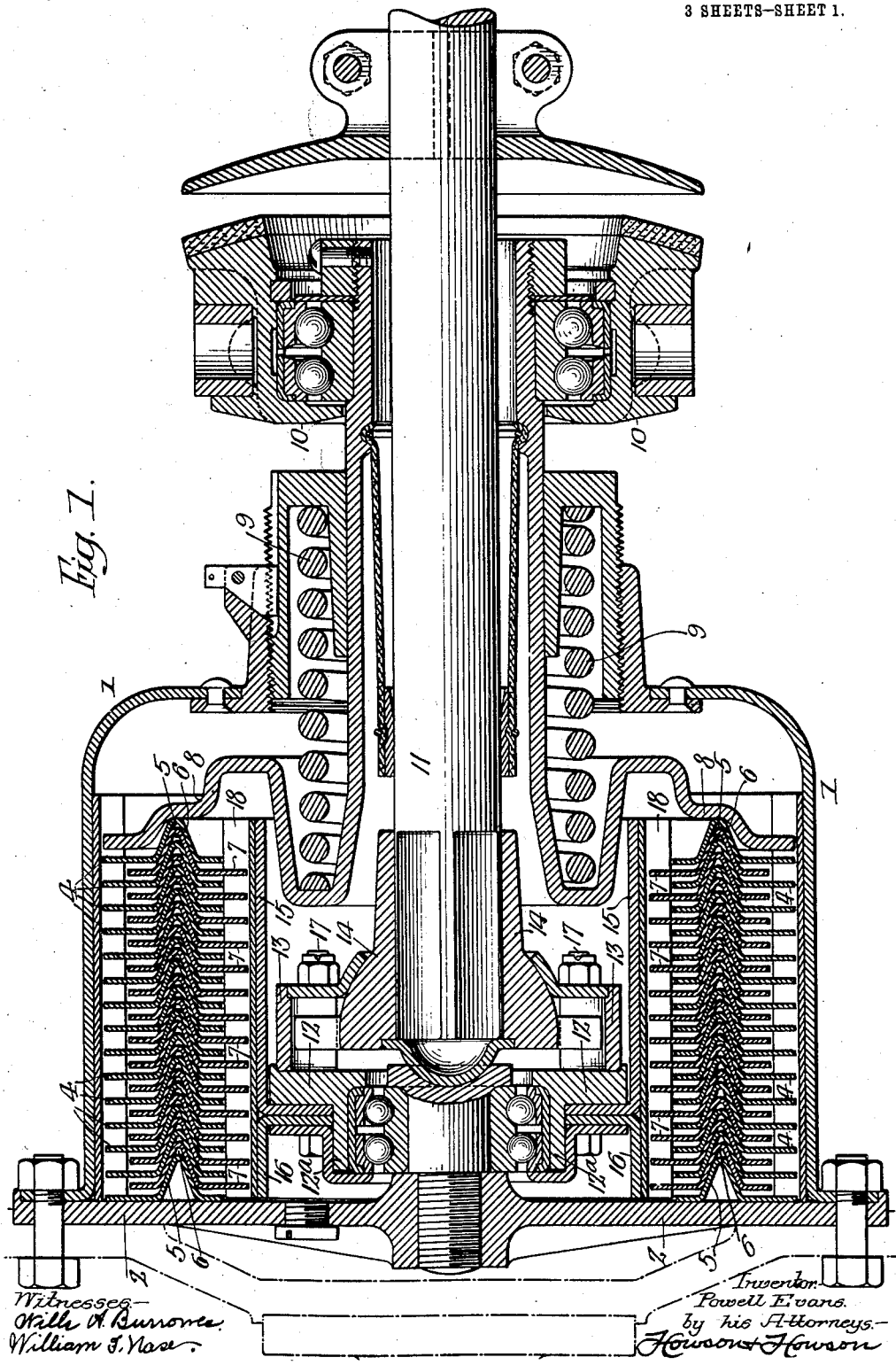

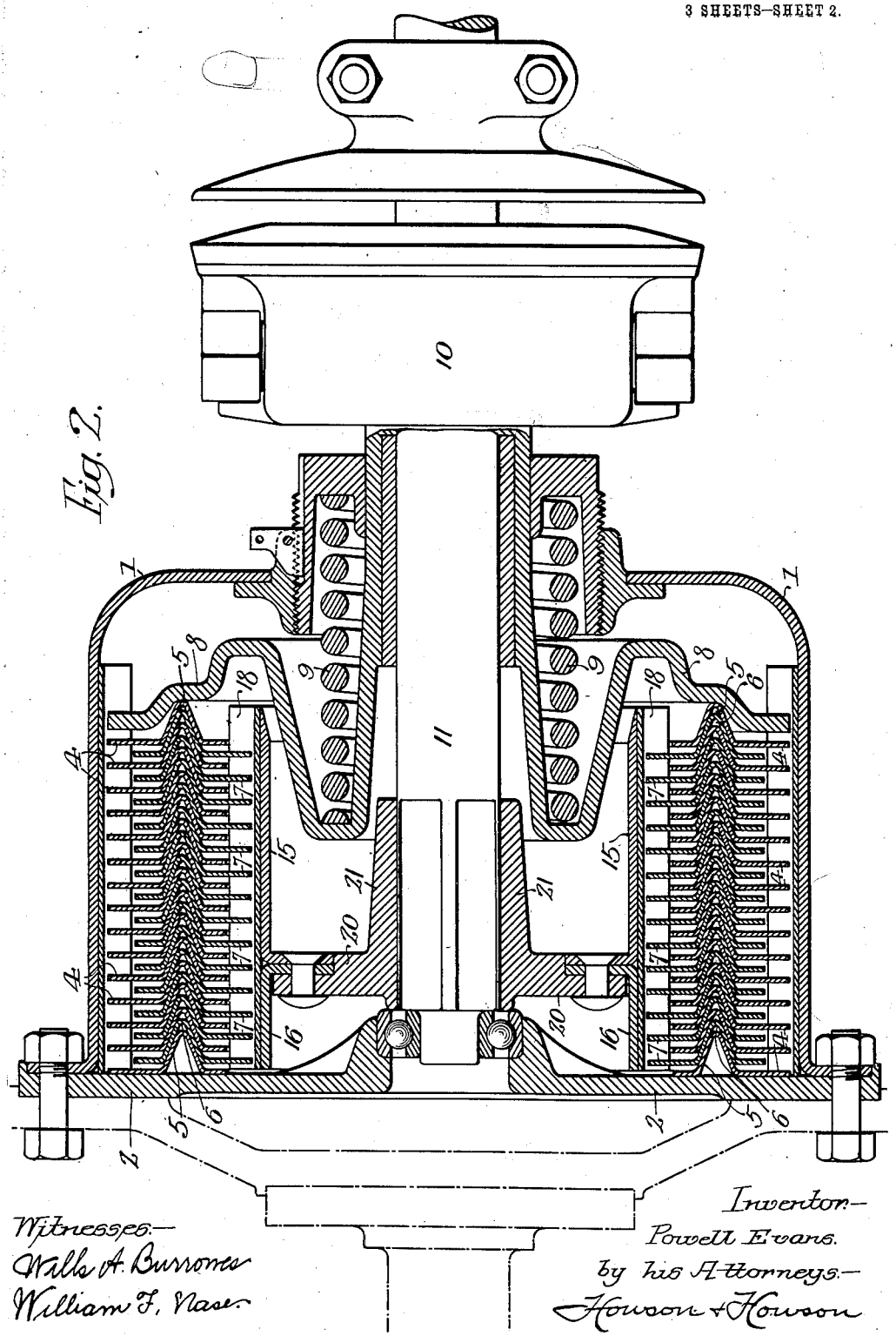

UNITED STATES PATENT OFFICE.

POWELL EVANS, OF PHILADELPHIA, PENNSYLVANIA.

CLUTCH CONSTRUCTION.

1,074,500.

Specification of Letters Patent. Patented Sept. 30, 1913.

Application filed May 8, 1912. Serial No. 696,010.

*To all whom it may concern:*

Be it known that I, POWELL EVANS, a citizen of the United States, residing in Philadelphia, Pennsylvania, have invented certain Improvements in Clutch Construction, of which the following is a specification.

One object of my invention is to so make and assemble the parts of a friction clutch of the multi-plate type as to materially reduce the cost of its construction and increase the ease and convenience of its manufacture.

I further desire to provide a plate clutch with an internal drum and supporting structure which shall be built up instead of being made of a single casting or forging; the various parts being of novel arrangement in order to permit of their economical manufacture in large quantities.

These objects and other advantageous ends I secure as hereinafter set forth, reference being had to the accompanying drawings, in which—

Figure 1 is a vertical section of a clutch made according to my invention; Fig. 2 is a vertical section of a slightly modified form of clutch, likewise constructed according to my invention; Fig. 3 is an end elevation of the inner plate carrying drum employed in that form of clutch shown in Fig. 1; Figs. 4 and 5 are respectively a front elevation and a vertical section of that form of inner plate carrying drum employed in the clutch shown in Fig. 2; Figs. 6 and 7 are respectively a vertical section and a front elevation of the core hub belonging to that form of clutch shown in Fig. 1; and Figs. 8 and 9 are respectively a vertical section and a front elevation of that form of core hub shown in Fig. 2.

In the above drawings, 1 represents the inclosing casing of a clutch of well known form, having an end cover plate 2 which, by any of the devices well known in this art, is usually connected to some source of power such as an engine. In the case illustrated the casing 1 has projecting from its interior cylindrical surface a series of parallel ribs forming keys engaged by a series of annular plates 4 each provided with an annular recess 5 of wedge shaped form designed to coact with the walls of a similar recess 6 belonging to the plates 7 of a second series. These two sets of plates or annular structures alternate with each other within the casing 1 and the plate 4 at one end of the series engages the cover 2 while the plate at the opposite end thereof is engaged by a pressure plate 8 acted on by a spring 9 so as to at all times force the plates of the two series together, except when drawn away from them by means of an actuating member 10 controlled in the usual manner.

The present invention has to do with the structure for transmitting power from the plates 7 to the shaft 11, and such structure includes a core hub which on the one hand is connected to the shaft 11 through a universal joint formed by an internally toothed member 13 engaged by the teeth of a hub 14 fixed to said shaft, and which on the other hand is connected to the plates 7 by a drum provided on its external surface with a series of parallel ribs forming keys.

In the case shown in Fig. 3, the body of the drum consists of a long cylindrical part 15 and a shorter cylindrical part 16 both inwardly flanged at their adjacent ends and spot welded or otherwise rigidly and permanently connected together. The cylindrical body portion of the core hub 12 is of proper diameter to enter the opening defined by the inner edges of these two flanges and its flange portion 12ª is designed to fit against and lie parallel with the outer face of the flange of the part 15. Bolts 17 rigidly connect the part 13 of the universal coupling or joint, the core hub and the composite drum structure 15—16. Mounted on said drum structure is a second structure for carrying the ribs or teeth directly engaged by the plate 7. This second structure preferably consists of a number of structurally independent longitudinally corrugated sections of such lateral dimensions as to preferably although not necessarily form a complete casing over the drum structure 15—16. These various sections 18 are rigidly and permanently connected to their supporting drum in any suitable manner usually and preferably by spot welding, and the supporting drum structure 15—16 may either be made with a smooth external cylindrical surface as in Figs. 4 and 5 or may have formed in it a series of outwardly projecting ribs or teeth so spaced and so formed as to fit into the corrugations of the sections 18 as shown in Figs. 1 and 3.

In the clutch shown in Fig. 2 the supporting drum structure 15—16 has its internal flanges not only spot welded together but directly bolted to the externally projecting flange 20 of a core hub 21 fixed directly to the driven shaft 11 and it is obvious that if desired, said drum structure may be corrugated or plain in order to properly receive the tooth sections 18 on which the plates 7 of the clutch are mounted as heretofore described.

In constructing the parts of my invention the core hubs are preferably made of pressed steel, while the two parts 15 and 16 of the main drum structure, as well as the sections 18 forming the plate engaging teeth, are preferably made of pressed sheet metal.

As is obvious, the operation of connecting together the parts 15 and 16 of the main drum structure and of thereafter mounting thereon the toothed sections 18, may be easily and inexpensively performed as may also the connecting of the main drum structure to the core hub.

I claim—

1. The combination in a clutch of a casing; two series of plates therein of which those of one series are operatively connected to said casing; a drum structure inside of the plates and consisting of two rigidly connected, structurally independent parts; tooth sections mounted on the drum structure and operatively engaging the plates of the second series; said tooth sections being structurally independent of the drum structure.

2. The combination in a clutch of a core hub; a main drum structure consisting of two inwardly flanged rigidly connected cylindrical sections mounted on said core hub; a series of tooth sections mounted on said drum structure; a series of plates operatively connected to said tooth sections; a second series of plates coöperating with the plates of the first series; and means for transmitting the power toward or from the plates of the second series.

3. A plate supporting structure for a clutch consisting of an externally flanged hub; two internally flanged cylindrical sections having their flanges rigidly connected together and attached to the flange of the hub; and a series of structurally independent tooth sections rigidly connected to both of the cylindrical sections.

In testimony whereof, I have signed my name to this specification, in the presence of two subscribing witnesses.

POWELL EVANS.

Witnesses:
 WILLIAM E. BRADLEY,
 JOS. H. KLEIN.